US011869742B2

(12) United States Patent
Vinokhodov et al.

(10) Patent No.: US 11,869,742 B2
(45) Date of Patent: Jan. 9, 2024

(54) X-RAY SOURCE WITH ROTATING LIQUID-METAL TARGET

(71) Applicant: EUV LABS, LTD, Moscow (RU)

(72) Inventors: Aleksandr Yurievich Vinokhodov, Troitsk Moscow (RU); Vladimir Vitalievich Ivanov, Moscow (RU); Konstantin Nikolaevich Koshelev, Troitsk Moscow (RU); Mikhail Sergeyevich Krivokorytov, Moscow (RU); Vladimir Mikhailovich Krivtsun, Troitsk Moscow (RU); Aleksandr Andreevich Lash, Moscow (RU); Vyacheslav Valerievich Medvedev, Troitsk Moscow (RU); Yury Viktorovich Sidelnikov, Troitsk Moscow (RU); Oleg Feliksovich Yakushev, Moscow Region Korolyev (RU); Denis Alexandrovich Glushkov, Nieuwegein (NL); Samir Ellwi, Crawley (GB); Oleg Borisovich Khristoforov, Moscow (RU)

(73) Assignees: ISTEQ B.V., Eindhoven (NL); ISTEQ GROUP HOLDING B.V., Eindhoven (NL)

( * ) Notice: Subject to any disclaimer, the term of this patent is extended or adjusted under 35 U.S.C. 154(b) by 84 days.

(21) Appl. No.: 17/604,922

(22) PCT Filed: Apr. 26, 2020

(86) PCT No.: PCT/RU2020/050083

§ 371 (c)(1),
(2) Date: Oct. 19, 2021

(87) PCT Pub. No.: WO2020/218952

PCT Pub. Date: Oct. 29, 2020

(65) Prior Publication Data

US 2022/0310351 A1 Sep. 29, 2022

(30) Foreign Application Priority Data

Apr. 26, 2019 (RU) ........................... RU2019113052
Apr. 26, 2019 (RU) ........................... RU2019113053
Jan. 25, 2020 (RU) ........................... RU2020103063

(51) Int. Cl.
*H01J 35/10* (2006.01)
*H01J 35/18* (2006.01)
*H01J 35/08* (2006.01)

(52) U.S. Cl.
CPC ............... *H01J 35/10* (2013.01); *H01J 35/08* (2013.01); *H01J 35/105* (2013.01); *H01J 2235/082* (2013.01); *H01J 2235/165* (2013.01)

(58) Field of Classification Search
CPC . H01J 35/10; H01J 2235/082; H01J 2235/165
See application file for complete search history.

(56) References Cited

U.S. PATENT DOCUMENTS 3,018,398 A * 1/1962 Atlee ...................... H01J 35/26 378/140
5,260,983 A * 11/1993 Ono ......................... H05G 1/66 378/93

(Continued)

*Primary Examiner* — Chih-Cheng Kao
(74) *Attorney, Agent, or Firm* — Nadya Reingand

(57) ABSTRACT

An X-ray beam is generated in an interaction zone of an electron beam and a target, the zone being an annular layer of a molten fusible metal in an annular channel of a rotating anode assembly. The channel has a surface profile which prevents slopping of the molten metal in the radial direction and in both directions along the rotation axis. The liquid-metal target forms a circular cylindrical surface due to the centrifugal force acting thereupon. The linear velocity of the target is preferably higher than 80 m/s; in a vacuum chamber, a changeable membrane made of carbon nanotubes is installed in the X-ray beam path and a protective screen with apertures for electron beam entry and X-ray beam exit is arranged around the interaction zone. The technical result (Continued)

consists in an X-ray source with increased power, brightness, lifetime and ease of use.

13 Claims, 3 Drawing Sheets

(56) References Cited

U.S. PATENT DOCUMENTS

| | | | | |
|---|---|---|---|---|
| 10,748,736 | B2 | 8/2020 | Zalubovsky | |
| 2003/0058995 | A1* | 3/2003 | Kutschera | H01J 35/10 378/144 |
| 2007/0297570 | A1* | 12/2007 | Kerpershoek | H01J 35/106 378/130 |
| 2012/0039442 | A1* | 2/2012 | Saito | H01J 35/26 378/112 |
| 2013/0051535 | A1* | 2/2013 | Davis | H01J 5/18 378/161 |
| 2019/0115184 | A1* | 4/2019 | Zalubovsky | H01J 35/18 |

* cited by examiner

X-RAY SOURCE WITH ROTATING LIQUID-METAL TARGET

TECHNICAL FIELD

The invention relates to powerful high-brightness X-ray sources with a liquid-metal target and to a method of generating X-ray radiation based on electrons deceleration.

PRIOR ART

High-intensity X-ray sources are used in such fields as microscopy, materials science, biomedical and medical diagnostics, materials testing, crystal and nanostructure analysis, atomic physics. They provide the foundation of the analytical basis of modern high-technology manufacturing and are an essential tool for developing new materials and products.

To implement methods of X-ray diagnostics, compact powerful high-brightness X-ray sources are required, characterized by reliability and long life-time.

In line with one approach known from patent RU 2068210, publ. on Oct. 20, 1996, the X-ray source is based on decelerating an accelerated electron beam focused on a rotating anode. The electron beam direction is close to direction of the centrifugal force acting on the anode in focus. At the same time, the temperature in focus is maintained at a level that is higher than the melting point of the anode material. The said device and the method are aimed at increasing the power and brightness of an X-ray source.

However, material of the rotating anode itself is used as the liquid-metal target, which solidifies when it goes out of the electron beam focus. As a result of various forces acting on the melt, including gravity and surface tension force, the shape of the rotating anode surface in the focus path area changes at quite a fast rate, which dramatically limits the X-ray source lifetime.

This disadvantage is overcome in the method of generating X-ray radiation, known from U.S. Pat. No. 6,185,277, published on Feb. 6, 2001, which comprises electron bombardment of a liquid-metal target through a thin window in the closed loop where the liquid metal circulates. The method and the device for generating X-ray radiation allow to ensure that vacuum chamber contamination is prevented if the flow of the target in the area of the closed loop thin window is turbulent. Also, the possibility of using liquid metals is implemented, without being limited to using only those with a low saturated vapor pressure, which allows to optimize the target material in order to improve X-ray radiation yield, David B, et al. (2004) Liquid-metal anode x-ray tube SPIE 5196, 432-443, in: Laser-Generated and Other Laboratory X-Ray and EUV Sources, Optics, and Applications; (G Kyrala, et al; Eds.)

However, the circulation system with an MHD pump which has to provide a head of more than 50 atm and a target speed of 40 m/s, as well as the thin (having a thickness of a few microns), preferably diamond, window of the closed loop increase the complexity of the device. Besides, the window, which the electron bombardment is carried out through, is exposed to mechanical, thermal and radiation loads, which limits the application of high densities of the electron beam current on the target and achieving high brightness of the X-ray source.

This disadvantage is largely overcome in the method and device for generating X-ray radiation, known from the patent application US 20020015473, published on Feb. 7, 2002, using the liquid-metal anode target in the form of a jet.

X-ray sources of this type are characterized by compact size and high stability of X-ray radiation. Because of large contact area between the liquid metal and the cooling surface of the heat-exchanging device, faster reduction of the target temperature is achieved. This way it is possible to obtain a high density of the electron beam energy flux on the target and to ensure a very high spectral brightness of the X-ray source. Thus, X-ray sources with a liquid-metal jet target have a brightness which is approximately by an order of magnitude higher than X-ray sources with a solid rotating anode, known, for example, from the U.S. Pat. No. 7,697,665, publ. on Apr. 13, 2010, where liquid metal is used for heat transfer and as a fluid dynamic bearing.

However, the circulation system of the jet liquid-metal target, comprising the gas pressure part and the high-pressure pump system for pumping liquid metal, is quite complex. Besides, in said radiation sources, the problem of X-ray window contamination is a typical one. The main sources of contamination are the nozzle and trap of the liquid-metal jet, from the area of which mist comprised of the target material microdroplets is spread. This typically results in the power of radiation source decreasing the faster, the higher the electron beam power is.

This disadvantage is partially overcome in the high-brightness X-ray source known from the U.S. Pat. No. 8,681,943, publ. on Mar. 25, 2014, where the X-ray beam generated as a result of electron bombardment of the jet liquid-metal target, exits the vacuum chamber via the X-ray window. As the target material, metal with a low melting point, such as indium, tin, gallium, lead or bismuth or an alloy thereof, is preferably used. The X-ray window, preferably made of beryllium foil, is provided with a protective film element and a system of its evaporative cleaning. This solution allows to increase intervals of X-ray source maintenance required to replace the X-ray window.

However, the temperatures required for evaporative cleaning are high, for example, around 1,000° C. or higher for evaporation of Ga and In, which makes the device much more complex.

INVENTION DISCLOSURE

The technical problem to be solved with the invention relates to creation of X-ray sources, free of said disadvantages, with high power and brightness, and with deep suppression of the contaminating particles flow out of the interaction zone of the electron beam and the target.

These objectives can be completed using the X-ray source, comprising a vacuum chamber with an X-ray window for outputting an X-ray beam generated in an interaction zone of an electron beam with a liquid-metal target.

The X-ray source is characterized the liquid-metal target is an annular layer of molten fusible metal located in an annular groove implemented in a rotating anode assembly, while the annular groove has a surface profile preventing an ejection of material of the liquid-metal target in a radial direction and in both directions along the axis of rotation (10) of rotating anode assembly.

Preferably, the annular layer of molten fusible metal is formed by centrifugal force on the surface of the annular groove, the surface facing the axis of rotation.

Preferably, due to the action of centrifugal force the liquid-metal target has a circular cylindrical surface with the axis of symmetry coinciding with the axis of rotation or has a surface that is marginally different from the said.

Preferably, the target material is selected from fusible metals, belonging to the group Sn, Li, In, Ga, Pb, Bi, Zn, and/or alloys thereof.

Preferably, the temperature of the liquid-metal target is lower than the melting point of the groove material.

Preferably, a linear velocity of the target is more than 80 m/s.

The embodiment of invention further comprising a membrane made of carbon nanotubes, CNT, which is installed in the vacuum chamber in the pathway of the X-ray beam.

Preferably, the CNT membrane is coated on a side outside a line-of-sight of the interaction zone.

The embodiment of invention further comprising a unit for replacing the CNT membrane, which does not require depressurization of the vacuum chamber.

In the embodiment of invention, further comprising a debris shield that is rigidly mounted to surround the interaction zone, said shield comprising a first opening for the entrance of the electron beam and a second opening for the exit of the X-ray beam.

The embodiment of invention slit gaps separate the debris shield (27) from the rotating anode assembly.

The embodiment of invention the debris shield is located opposite the angular sector of the target near the interaction zone.

Preferably, the debris shield (27) is circular.

In the embodiment of invention, the rotating anode assembly is equipped with a liquid cooling system.

In another embodiment, the size of the interaction zone or of focus spot of the electron beam on the target is less than 50 μm.

Preferably, the axis of rotation can have any direction.

The method for generating X-ray radiation comprising an electron bombardment of a liquid-metal target on a surface of the rotating anode assembly and output of an X-ray beam, generated in an interaction zone of an electron beam with the liquid-metal target, through an X-ray window of a vacuum chamber, said method comprising: the target formation by centrifugal force as an annular layer of molten fusible metal on a surface of an annular groove implemented in a rotating anode assembly, and providing the molten fusible metal not to be ejected in the radial direction and in both directions along the axis of rotation by a chosen profile of the annular groove surface.

Preferably, the liquid-metal target is rotated with a linear velocity of more than 80 m/s.

In embodiments of invention, the X-ray window is protected from debris generated along with the X-ray radiation in the interaction zone by means of a CNT membrane installed in front of the X-ray window, and the CNT membrane is replaced as needed.

In embodiments of invention, the exit of debris particles outside the interaction zone is additionally suppressed by means of a debris shield rigidly mounted to surround the interaction zone, said shield having a first opening forming an entrance for the electron beam and a second opening forming an exit for the X-ray beam.

Preferably, the rotating anode assembly is cooled by a liquid cooling system.

In embodiments of invention, further comprising: termination of the electron bombardment of the liquid-metal target before the rotation is slowed or stopped and cooling the target to a solid state.

In embodiments of invention, where the starting melting of the target is carried out by electron bombardment and/or inductive heating.

The technical result of the invention consists in simplifying the system of liquid-metal target formation, providing the possibility to use higher power electron beams by increasing target velocity in the interaction zone, optimizing the target material, eliminating contamination of the exit window, and on that basis implementing possibilities to improve brightness, life time and ease of operation of X-ray sources.

The above-mentioned and other objectives, advantages and features of this invention will be made more evident in the following non-limiting description of its embodiments, provided as an example with reference to attached drawings.

BRIEF DESCRIPTION OF DRAWINGS

The essence of invention is explained by drawings wherein.

Identical device elements are designated by the same reference numbers on the drawings.

These drawings do not cover and, moreover, do not restrict the complete scope of embodiments of this technical concept; they are provided only as supporting materials to demonstrate specific instances of its implementation.

EMBODIMENTS OF INVENTION

Figure 1:
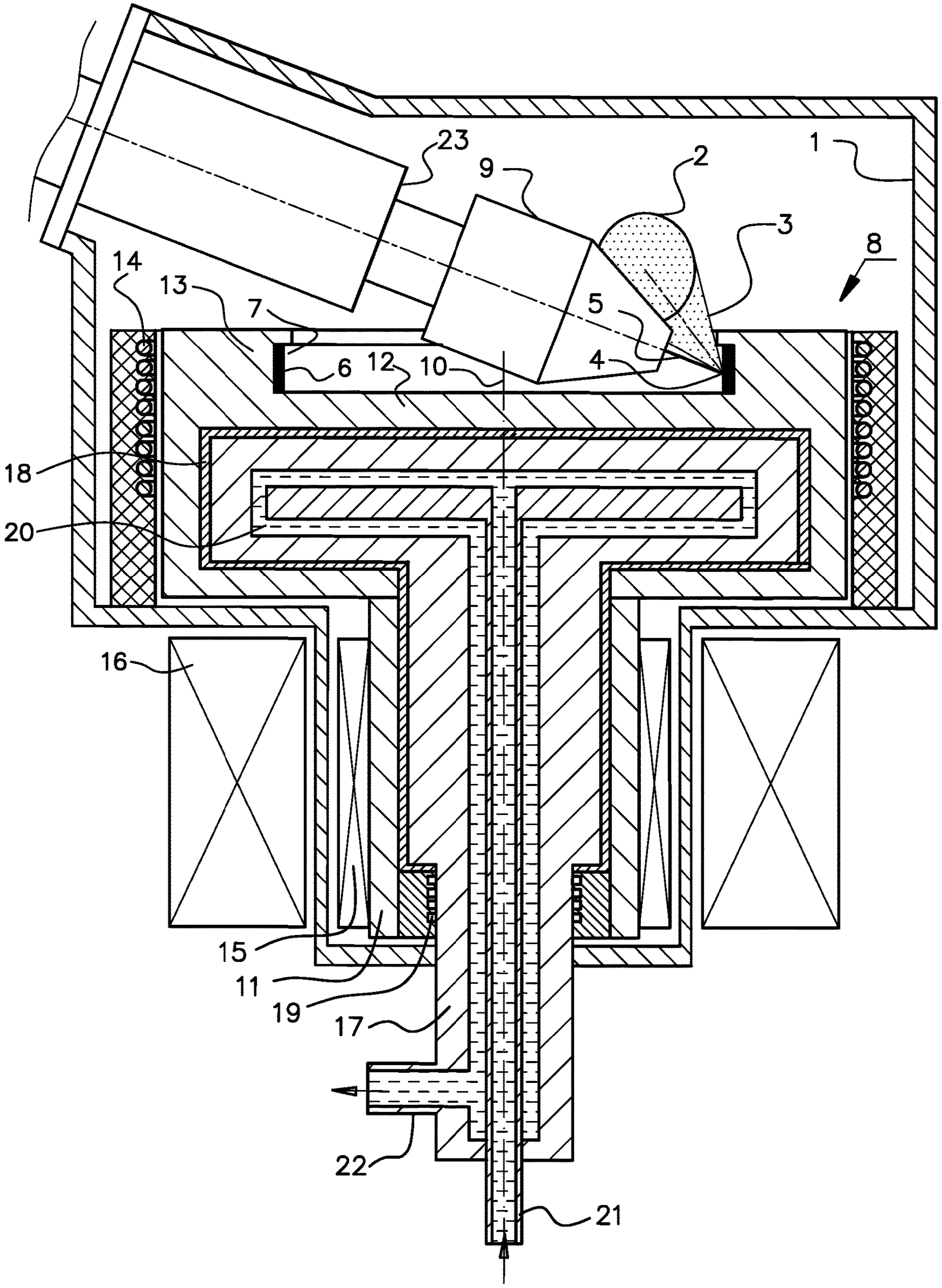
FIG. 1, FIG. 2, FIG. 3—X-ray source schematics according to embodiments of this invention.

In the embodiment of invention, schematically presented in FIG. 1, the X-ray source comprises the vacuum chamber 1 with the X-ray window 2 for outputting the X-ray beam 3 generated in the interaction zone 4 of the electron beam 5 with the target 6 as a result of its electron bombardment.

The vacuum chamber 1 can be provided with a vacuum pumping system, or be sealed off.

The pressure-tight X-ray window 2 preferably consists of a thin membrane.

Requirements to the exit window material include high transparency for X-ray beams, i.e. low atomic number, and sufficient mechanical strength in order to separate vacuum from the environment pressure. Beryllium is widely used for such windows.

The X-ray source is characterized in that the target 6 is an annular layer of molten metal formed by the action of centrifugal force, located in the annular groove 7 implemented in the rotating anode assembly 8 of the electron gun 9. The annular groove 7 has a surface profile that prevents material of the liquid-metal target 6 exposed to the action of centrifugal force from being ejected in the radial direction and in both directions along the axis of rotation 10.

The anode assembly 8 mounted on the shaft 11 with the stabilized axis of rotation 10 is rotated by an electric motor or another drive.

According to the invention, due to a sufficiently high centrifugal force the target 6 has a circular cylindrical or similar surface with the axis of symmetry coinciding with the axis of rotation 10, FIG. 1. At the same time, the volume of material of the liquid-metal target 6 does not exceed the volume of the annular groove 7.

To form the target 6, part of the rotating anode assembly is preferably implemented as the disc 12 having peripheral portion in the form of the annular barrier 13 or a shoulder. At the same time, the annular groove 7 is implemented on the surface of the annular barrier 13 facing the axis of rotation 10.

The surface of the groove 7 can be formed by the cylindrical surface facing the axis of rotation 10 and two radial surfaces, as shown in FIG. 1, without being limited only to this option.

The groove material has a melting point that is higher than the temperature of the liquid-metal target, whose material preferably belongs to the group of non-toxic fusible metals including Sn, Li, In, Ga, Pb, Bi, Zn and/or their alloys. Metals and their alloys with low vapor pressure are preferable, such as Ga and Sn and their alloys.

For example, Galinstan alloy can be used as material of the target 6, including 68.5% Ga, 21.5% In and 10% Sn by weight, with the melting and freezing point of −19° C., being in the liquid state throughout the complete time of operation. A preferable material of the target can be the alloy including 95% Ga and 5% In by weight, and having the melting point of 25° C. and the freezing point of around 16° C.

For X-ray source operation, as well as its storage and transportation, target materials can be preferable that are solid in the non-working state and require heating, for example, by the electron beam 5 itself, for transition into working condition. The following can be used as such target materials: Sn/In alloy with the melting point of 125° C., the alloy containing 66% In and 34% Bi and having the melting and freezing point of around 72° C., without being limited only to the above.

In order to increase the yield of X-ray radiation, it is preferable to use a target material with a high atomic number, for example, a lead-base alloy.

In general, the proposed design of the rotating anode assembly provides a wide range of options for optimizing the target material.

To transfer the target material into molten state, the X-ray source can be provided with the compact inductive heating system 14 to start the melting of the target material. The inductive heating system 14 can be implemented with the possibility of stabilizing the temperature of the target material in the pre-defined optimal temperature range.

The rotating drive can be implemented as an electric motor with the cylindrical rotor 15 located in the vacuum chamber 1, with the rotating drive 11 and the stator 16 located outside the vacuum chamber 1.

In other embodiments of invention the rotating drive can be implemented in the form of a magnetic coupling, with the outside drive half-coupling and the inside idle half-coupling.

To increase the magnetic adherence, part of the vacuum chamber wall between the inside and outside parts 15, 16 of the rotating drive must be sufficiently thin, and its material must have a high electrical resistance and minimum magnetic permeability. A dielectric or stainless steel can be used as such a material. In the latter case the wall thickness can be around 0.5 mm.

In the particular embodiment of invention, FIG. 1, the rotating anode assembly 8 with the rotor 15 is supported by the liquid-metal fluid dynamic bearing. The said bearing includes the fixed shaft 17 and the layer of liquid metal 18, for example, gallium or its alloy, such as, for example, gallium-indium-tin (GaInSn), characterized by low viscosity and low melting point.

The rotor 15 is provided with the annular sliding seal 19 surrounding a part of the lateral surface of the fixed shaft 17 with a gap between them. The gap between the sliding seal 19 and the fixed shaft 17 has a size ensuring that the shaft 11 with the rotor 15 rotates without leaking of the liquid metal 18. For this purpose, the gap width is 500 μm or less. The sliding seal 19 in the FIG. 1 has several annular channels where the liquid metal 18 is accumulated. This way the sliding seal 19 functions as a labyrinth sealing ring.

The fluid dynamic bearing with the liquid metal can withstand very high temperatures without vacuum contamination. A large contact area of the bearing and the liquid-metal lubrication ensure a highly efficient heat dissipation from the rotating anode assembly 8 by means of the liquid coolant 20, for example water, or by means of a coolant with a higher boiling point. For the liquid coolant 20, circulating through the heat exchanger of the cooling system (not shown), the inlet channel 21 and the output channel 22 are provided in the fixed shaft 17, wherein the flow direction of the coolant 20 is shown by arrows in FIG. 1.

Accordingly, in preferred embodiments of invention the rotating anode assembly 8 is provided with the liquid cooling system 20.

In the embodiment of invention presented in FIG. 1, the layer of liquid metal 18 acts as a sliding electrical contact between the rotating anode assembly 8 and the power supply 23 of the electron gun, as well as for heat transfer from the rotating target 6 to the liquid coolant 20.

In other embodiments of invention the liquid coolant 20 can be supplied directly into the rotating anode assembly 8. Magnetic fluid seals and/or sliding sleeves can be used to ensure tightness of the rotating parts. Various types of rolling-element bearings can be used to support the rotating anode assembly.

In contrast to X-ray sources with a jet liquid-metal anode, the level of generated debris in the proposed design is significantly decreased, because it eliminates its intensive sources, such as the nozzle and the liquid-metal jet trap, out of the area of which mist consisting of target material microdroplets, is spread. As a result, the complex system of evaporative cleaning of the exit window and its relatively frequent replacement are not required. As a result, the proposed invention significantly improves reliability and ease of operation of a liquid-metal target X-ray source. A possibility of its operation without additional means for debris suppression is implemented.

However, in the course of long-term operation of a liquid-metal target X-ray source, transparency of the X-ray window 2 may deteriorate due to vapors and clusters of the target material being deposited on its surface. Consequently, to ensure the longest possible period of operation without complex maintenance, means for suppressing debris and protecting the X-ray window 2 therefrom can be additionally introduced.

Figure 2:
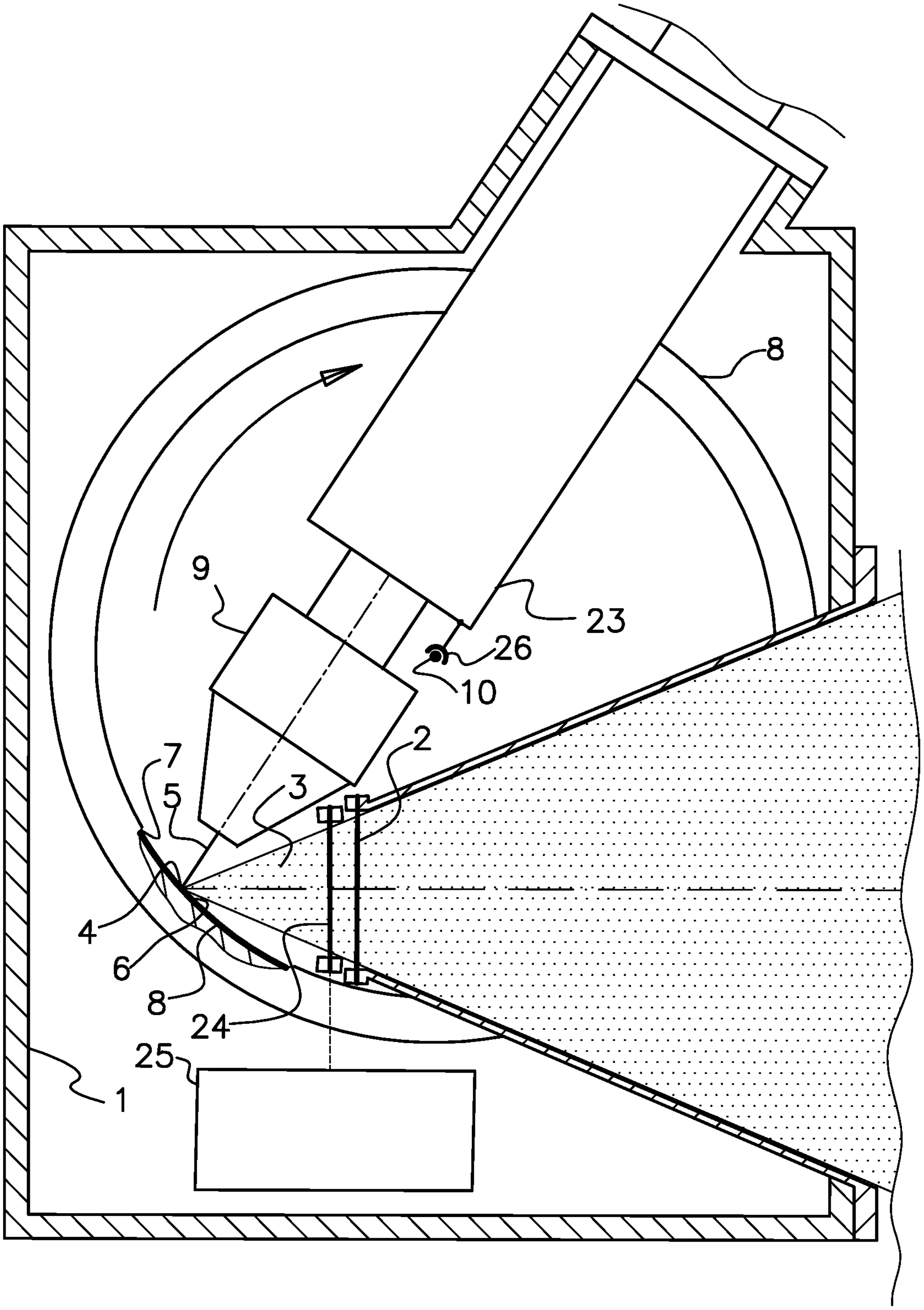

In FIG. 2, the embodiment of the X-ray source is schematically shown, wherein the membrane 24 made of carbon nanotubes, CNT membrane, is installed in the vacuum chamber 1 in the pathway of the X-ray beam 3.

The CNT membrane 24 is an optical element, preferably in the form of a free-standing CNT film mounted on a frame or in a casing, 200 to 20 nm thick, without being limited only to this range, with low absorption of X-ray radiation, that can have coatings and/or filler to extend its lifetime or give other properties. Thus, the CNT membrane can serve as a strong base which the coating is applied onto, for example, metal foil serving as a spectral filter in the X-ray range.

As demonstrated by research, in contrast to the majority of coating materials the CNT membrane is not wetted by the target material and absorbs it to a far lesser degree. Consequently, the CNT membrane can be coated, but preferably on a side outside a line-of-sight of the interaction zone 4, that is less exposed to the debris. At the same time, the CNT membrane 24 is preferably mounted flush with the X-ray window 2 to completely protect from debris both the X-ray window and the side of the CNT membrane 24 facing it.

The CNT membrane 24 characterized by high conductivity is preferably grounded to drain its electrostatic charge, which decreases the amount of debris deposited on the membrane.

In embodiments of invention, in the X-ray tube 1 the compact unit 25 is installed to replace the CNT membrane after its transparency deteriorates to a pre-defined value. Preferably, the unit 25 for replacing the CNT membrane does not require depressurization of the vacuum chamber 1. The unit 25 for replacing the CNT membrane, for example, of the revolver type, can be actuated from outside the vacuum chamber 1, for example, by means of a drive via a magnetic coupling, or via a gland, or by means of a miniature step motor installed in the vacuum chamber, without being limited only to these options.

It should be noted that for a long service life of a CNT membrane, the linear velocity of the target should be high enough, more than 20 m/s, preferably more than 80 m/s, so that the micro-droplet fraction of contaminating particles is directed mainly tangentially, and not towards the CNT membranes.

In FIG. 2, the axis of rotation 10 is perpendicular to the drawing plane. The rotating anode assembly 8 with the target 6 is electrically connected to the power supply 23 of the electron gun via the sliding electrical contact 26 that is preferably located on the rotating shaft. The device parts which are the same in this embodiment as in the embodiments described above (FIG. 1) have the same item numbers in FIG. 2, their detailed description is omitted.

Figure 3:
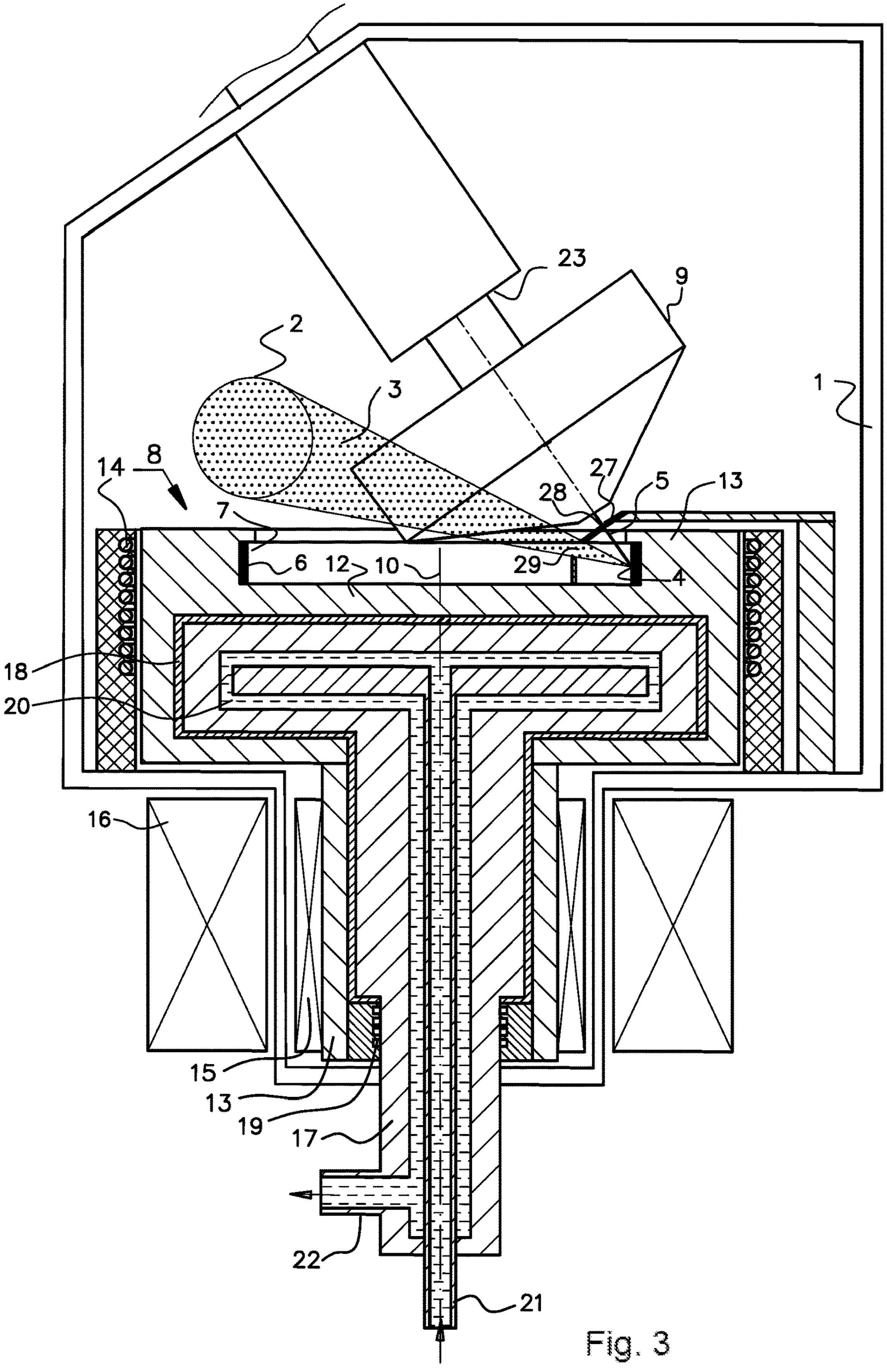

In FIG. 3, the X-ray source is schematically shown, wherein to additionally suppress the exit of debris particles outside the rotating anode assembly, the debris shield 27 is introduced, rigidly mounted to surround the interaction zone 4. The debris shield comprises the first opening 28 forming an entrance for the electron beam 5 to the target 6, and the second opening 29 forming an exit for the X-ray beam 3 from the interaction zone 4 to the X-ray window 2.

Introduction of the debris shield 27 results in powerful suppression of debris particles flow from the interaction zone of the electron beam and the target. For deeper debris suppression, the shield 12 is separated from the rotating anode assembly 8 by means of slit gaps. In this case the focal spot is located in the basically closed cavity formed by surfaces of the groove 7 and the debris shield 27. Exit of the debris particles (vapors, ions, clusters of the target material) from the said cavity generated with the X-ray radiation in the interaction zone 3 is only possible via two small openings 28, 29, which ensures a low level of contamination in the X-ray source.

According to an embodiment of invention illustrated in FIG. 3, the debris shield 12 may be located opposite the angular sector of the target 3 near the interaction zone 4, and can be separated from it by slit gaps on the ends.

In another embodiment, the debris shield 27 can be circular.

The first and second openings 28, 29 in the shield 27 can be conical, which allows to minimize their cross-section area in order to more efficiently retain debris in the cavity between the debris shield 27 and the annular groove 7.

For the same purpose, in the embodiments of invention the electron beam 5 and the X-ray beam 3 are oriented in such a manner that in the interaction zone 4 the direction of linear velocity vector of the target, that determines the prevailing direction of the exiting microdroplet and cluster fraction of debris, is significantly different from the direction towards the openings 28, 29 in the shield 27.

An X-ray source with a liquid-metal target implemented according to this invention has the benefits of modern cyclically operating X-ray tubes for tomography. The latter are characterized by a high (up to 100 kW) operating power achieved at the rotating anode thermal capacity of around 5 MJ with the effective focal spot area of less than 1 $mm^2$.

At the same time, the X-ray source implemented according to this invention has the benefits of X-ray sources with the jet liquid-metal anode, which allow to operate with a very small size of focal spots, as the limitations related to melting of the target, are non-existent. According to the above, in the preferred embodiments of invention, the high-brightness X-ray source is a microfocus one. In these embodiments of invention a system of electrostatic and/or magnetic lenses located at the exit of the electron gun 9 is used to form the electron beam 5 with the focal spot on the liquid-metal target 6 having a size of 50 to 5 μm. Generally, focal spots with sizes below 1 μm can be obtained. It should be noted that the presence of electrostatic and/or magnetic lens systems for microfocusing of the electron beam results in larger cross-section dimensions of the electron gun 9, as schematically shown in FIG. 3.

In the embodiments of invention the linear velocity of the target is more than 80 m/s, which is higher than in the known analogs. Higher target velocity allows for operation at a high (kW) level of the electron beam power and ensures a more efficient dissipation of the power input into the target.

Due to the presence of centrifugal force, the rotating target surface is stable and resilient to disturbances introduced by the electron beam. If the rotation speed is sufficiently high, the electron beam interacts with an undisturbed "fresh" surface of the target, which ensures high spatial and energetic stability of the X-ray source. Stability of the target surface is the higher, the higher the velocity of the liquid-metal target is.

The proposed design of the anode assembly allows for implementing its rotation frequency of up to 200-400 rpm. This allows for achieving values of the liquid-metal target linear velocities in the interaction zone of the electron beam of up to 100-200 m/s. At the same time, high pressure pumping systems used in known analogs are not required. This significantly simplifies the design of high-brightness and high-power X-ray source.

The method of generating X-ray radiation is implemented as follows. The vacuum chamber 1 is evacuated using an oil-free pumping system to a pressure below $10^{-5} \ldots 10^{-8}$ bar. In other embodiments the vacuum chamber 1 can be sealed-off. The anode assembly 8 is rotated, for example, by means of a drive that consists of the stator 16 and the rotor 15. In the embodiments of invention, rotation is carried out using the fluid dynamic bearing, comprising the fixed shaft 17 and the layer of liquid metal 18, FIG. 1.

Under the action of centrifugal force, the target 6 is formed as a layer of molten metal belonging to the group Sn, Li, In, Ga, Pb, Bi, Zn and/or alloys thereof, on the surface of the annular groove 7 of the rotating anode assembly 8 facing the axis of rotation 10.

If required, the target material is previously molten using the fixed inductive heating system 14.

The power supply 23 of the electron gun and the liquid cooling system 20 are switched on. Using the power supply 23, high voltage is applied between the cathode and anode located in the electron gun 9, typically between 40 kW and 160 kW. This voltage potential is used to accelerate electrons emitted by the cathode in the direction of the rotating anode assembly 8.

The electron beam 5 generated by the electron gun is used to perform electron bombardment of the liquid-metal target 6. As a result of electron bombardment, in the interaction zone 4 on the rotating liquid-metal target 6 the X-ray beam 3 is generated exiting the vacuum chamber via the X-ray window 2.

To achieve high brightness of the X-ray source, electron bombardment of the liquid-metal target is carried out with a microfocus electron gun having the size of the interaction zone or of focal spot in the range of 50 to 1 μm. To obtain a small size of the focal spot, focusing means in the form of electrostatic and/or magnetic and electromagnetic lenses are used in the cathode module 9 of the electron gun.

To decrease the hydrodynamic and thermal load on the target surface in the interaction zone, it is rotated with a high linear velocity, over 80 m/s.

Preferably, heat from the rotating anode assembly 8 is dissipated using the liquid cooling system 20. In the particular embodiment of invention, heat from the rotating anode assembly to the liquid coolant is transferred via the layer of liquid metal 18 of the fluid dynamic bearing, FIG. 1.

In embodiments of invention, heat dissipation can be made by radiation.

The X-ray source can operate in the continuous or cyclic mode. In the latter case the anode assembly 8 can be decelerated after each cycle to extend its lifetime.

In embodiments of invention, electron bombardment of the target is terminated before the rotating anode assembly is slowed or stopped and the target is cooled to a solid state. This ensures ease of operation of the X-ray source, in particular, it allows to freely orientate the axis of rotation 10 of the anode assembly 8 and output the X-ray beam 3 in any required direction.

The next initial melting of the target is carried out by electron bombardment and/or using the inductive heating system.

In the process of operation, the target temperature is maintained below the melting point of the annular groove material which ensures long-term stable operation of the X-ray source.

When the CNT membrane transparency changes to the pre-defined value, it is replaced using the unit 25 for replacing.

In embodiments of the method for generating X-ray radiation, the exit of debris particles outside the rotating anode assembly is further suppressed using the debris shield 27 rigidly mounted near the interaction zone 4. At the same time, the flow of debris particles from the interaction zone is restricted by the apertures of two said openings.

The liquid-metal target rotating at a high velocity produces much less debris as compared to the X-ray sources with jet liquid-metal anode. At the same time, an obvious benefit of the proposed design is elimination of the need to use a highly complex system of evaporative X-ray window cleaning at temperatures of 1,000° C. and higher. All of this simplifies the design, increasing the operating lifetime of the high-brightness X-ray source and improving conditions for its maintenance and operation.

Thus, this invention allows to increase the brightness of liquid-metal target X-ray sources, simplify their design, extend their lifetime and ease of operation.

Particular aspects of the subject-matter disclosed herein are set out in the following numbered clauses. The claims of the present disclosure or of any divisional application might be directed to one or more of these aspects.

1. An X-ray source, comprising a vacuum chamber with an X-ray window for outputting an X-ray beam generated in a focus spot of an electron beam on a liquid-metal target, characterized in that the liquid-metal target is a layer of molten metal formed by centrifugal force on a surface of an annular groove, the surface facing the axis of rotation, of a rotating anode assembly of an electron gun.

2. The device according to clause 1, wherein the rotating anode assembly is a disk having a peripheral portion in the form of an annular barrier, with the internal surface facing the rotation axis, while the annular groove has a surface profile preventing an ejection of material of the liquid-metal target in a radial direction and in both directions along the axis of rotation.

3. The device according to clause 1 or 2, wherein the rotating anode assembly is equipped with a liquid cooling system.

4. The device according to any of the preceding clauses, wherein the target material is selected from fusible metals, belonging to the group Sn, Li, In, Ga, Pb, Bi, Zn, and alloys thereof.

5. The device according to any of the preceding clauses, wherein the size of the focus spot of the electron beam on the target is less than 50 μm.

6. The device according to any of the preceding clauses, wherein a linear velocity of the target is not less than 80 m/s.

7. The device according to any of the preceding clauses, further comprising a membrane made of carbon nanotubes (CNT membrane), which is installed in the vacuum chamber in the pathway of the exiting X-ray beam.

8. The device according to clause 7, wherein the CNT membrane is coated on a side located outside a line-of-sight of the focus spot on the target.

9. The device according to clause 7 or 8, further comprising a unit for replacing the CNT membrane, which does not require depressurization of the vacuum chamber.

10. A method for generating X-ray radiation comprising an electron bombardment of a liquid-metal target and output of an X-ray beam, generated in a focus spot of an electron beam on the liquid-metal target, through an X-ray window of a vacuum chamber, characterized in that the liquid metal target is formed by centrifugal force as a layer of molten metal belonging to the group Sn, Li, In, Ga, Pb, Bi, Zn and alloys thereof, on a surface of an annular groove implemented in a rotating anode assembly, the surface facing the rotation axis.

11. The method according to clause 10, wherein the electron bombardment of the liquid-metal target with the focus spot size of less than 50 μm is carried out.

12. The method according to clause 10 or 11, wherein the liquid-metal target is rotated with a linear velocity of more than 80 m/s.

13. The method according to any of the clauses 10-12, wherein the rotating anode assembly is cooled by a liquid cooling system.

14. The method according to any of the clauses 10-13, further comprising: termination of the electron bombardment of the liquid-metal target before the rotation is slowed or stopped and cooling the target to a solid state.

15. The method according to any of the clauses 10-14, wherein the X-ray window is protected from debris by means of a CNT membrane installed in front of the X-ray window, and the CNT membrane is replaced as needed.

16. A source of short-wave high-brightness radiation, comprising a vacuum chamber with a rotating target assembly which introduces a target in the form of a layer of molten metal into an interaction zone, the layer being formed by centrifugal force on the surface of an annular groove of the rotating target assembly, the surface facing the axis of rotation, a beam of energy focused on the target in the interaction zone, and means of debris suppression in the pathway of a short-wave radiation beam, characterized in that the means of debris suppression comprise: rotation of the target with a high, over 20 m/s, linear velocity, that determines the prevailing direction of the exiting microdroplet fraction of debris from the interaction zone, exit of the beam of short-wave radiation in a direction different from the prevailing direction of the exiting microdroplet fraction of debris, a replaceable membrane made of carbon nanotubes (CNT membrane) with a high, over 50%, transparency in the range of wavelengths shorter than 20 nm, installed in a line-of-sight area of the interaction zone and completely overlapping the aperture of the short-wave radiation beam.

17. The device according to clause 16, wherein the energy beam is a pulsed laser beam, and the short-wave radiation is generated by laser plasma of the target material in the extreme ultraviolet (EUV) and/or soft X-ray and/or X-ray range.

18. The device according to clause 16 or 17, wherein additionally, such means of debris suppression, as electrostatic and magnetic fields, flows of protective gas and foil traps, are used.

19. The device according to any of the clauses 16-18, wherein the CNT membrane has a thickness in the range of 20 to 100 nm.

20. The device according to clause 16, wherein the CNT membrane acts as a window between the high and medium vacuum compartments of the vacuum chamber.

21. The device according to any of the clauses 16-20, wherein the energy beam is an electron beam, the rotating target assembly acts as the rotating anode of the electron gun, and the short-wave radiation is X-ray radiation generated by the electron bombardment of the target.

22. The source of short-wave radiation comprising the vacuum chamber with the rotating target assembly introducing the target in the form of the molten layer of metal into the interaction zone with the focused laser beam, the useful short-wave radiation beam exiting the interaction zone, and the means of debris suppression, characterized in that a debris shield is rigidly mounted to surround the interaction zone, said shield comprising a first opening forming an entrance for the focused laser beam into the interaction zone, and a second opening forming an exit for the useful short-wave radiation beam from the interaction zone.

23. The source of radiation according to clause 22, wherein slit gaps separate the shield from the rotating target assembly.

24. The source of radiation according to clause 22 or 23, wherein the shield is circular.

25. The source of radiation according to any of the clauses 22-24, wherein at least one of the two openings in the shield is conical.

26. The source of radiation according to any of the clauses 22-25, wherein the axis of the short-wave radiation beam is directed at an angle of more than 45 degrees to the plane of the target assembly rotation.

27. The source of radiation according to any of the clauses 22-26, wherein the prevailing direction of debris particles exiting the interaction zone is significantly different from the direction to, at least, one of the two openings in the shield.

28. The source of radiation according to clause 27, wherein the vector of the target linear speed in the interaction zone and, at least, one of the two openings, are located on different sides of the plane passing through the interaction zone and the rotation axis of the target assembly.

29. The source of radiation according to clause 27 or 28, wherein the axis of at least one of the two openings in the shield is directed at an angle of less than 45 degrees to the target plane.

Thus, the embodiments of invention provide for creation of X-ray sources with deep suppression of debris, with the highest brightness and power, long life time and excellent ease of use.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

INDUSTRIAL APPLICABILITY

The proposed X-ray sources are intended for a number of applications, including microscopy, materials science, X-ray inspection of materials, biomedical and medical diagnostics.

What is claimed is:

1. An X-ray source, comprising a vacuum chamber (1) with an X-ray window (2) for outputting an X-ray beam (3) generated in an interaction zone (4) of an electron beam (5) with a liquid-metal target (6) wherein the liquid-metal target (6) is an annular layer of molten fusible metal located in an annular groove (7) implemented in a rotating anode assembly (8), a part of the rotating anode assembly is made in the form of a disk (12) having a peripheral portion in the form of an annular barrier (13), and the annular groove is implemented on the surface of the annular barrier facing the axis of rotation (10); due to the action of centrifugal force, the liquid-metal target (6) has a circular cylindrical surface with the axis of symmetry coinciding with the axis of rotation (10); while the annular groove (7) has a surface profile preventing an ejection of material of the liquid-metal target (6) in a radial direction and in both directions along the axis of rotation (10) of the rotating anode assembly (8);

further comprising a debris shield (27) that is rigidly mounted to surround the interaction zone (4), said shield comprising a first opening (22) for the entrance of the electron beam (5) and a second opening (28) for the exit of the X-ray beam (3), while the debris shield (27) is separated from the rotating anode assembly by slit gaps, wherein a vector of the linear velocity of the target in the interaction zone and at least one of the two openings are located on opposite sides of the plane passing through the interaction zone (4) and the axis of rotation (10) and the linear velocity of the target is high enough so that a droplet fraction of debris particles exiting the interaction zone (4) is directed mainly tangentially to the target surface and not towards the openings (22), (28) in the debris shield (27).

2. The X-ray source according to claim 1, wherein the annular layer of molten fusible metal is formed by centrifugal force on the surface of the annular groove, the surface facing the axis of rotation (10).

3. The X-ray source according to claim 1, wherein the target material is selected from fusible metals, belonging to the group Sn, Li, In, Ga, Pb, Bi, Zn, or alloys thereof.

4. The X-ray source according to claim 1, wherein the temperature of the liquid-metal target is lower than the melting point of the groove material.

5. The X-ray source according to claim 1, further comprising an inductive heating system (14) that is configured to start a melting of the target material.

6. The X-ray source according to claim 1, wherein a linear velocity of the target is more than 80 m/s.

7. The X-ray source according to claim 1, further comprising a replaceable membrane (24) made of carbon nanotubes, CNT, which is installed in the vacuum chamber in the pathway of the X-ray beam (3).

8. The X-ray source according to claim 1, wherein the rotating anode assembly (8) is equipped with a liquid cooling system (20).

9. A method for generating X-ray radiation comprising an electron bombardment of a liquid-metal target (6) on a surface of a rotating anode assembly (8) and output of an X-ray beam (3), generated in an interaction zone (4) of an electron beam (5) with the liquid-metal target, through an X-ray window (2) of a vacuum chamber (1), said method comprising:

the target (6) formation by centrifugal force as an annular layer of molten fusible metal on a surface of an annular groove (7) implemented in the rotating anode assembly (8), a part of the rotating anode assembly is made in the form of a disk (12) having peripheral portion in the form of an annular barrier (13), and the annular groove is implemented on the surface of the annular barrier facing the axis of rotation (10), providing the molten fusible metal not to be ejected in the radial direction and in both directions along the axis of rotation (10) by a chosen profile of the annular groove surface, and debris suppression by means of a debris shield (27) rigidly mounted to surround the interaction zone (4), said shield having a first opening (28) forming an entrance for the electron beam (5) and a second opening (29) forming an exit for the X-ray beam (3) with the liquid-metal target rotating with a linear velocity of more than 80 m/s, wherein a vector of the linear velocity of the target in the interaction zone and at least one of the two openings are located on different sides of the plane passing through the interaction zone (4) and the axis of rotation (10).

10. The method according to claim 9, wherein the X-ray window (2) is protected from debris generated along with the X-ray radiation in the interaction zone (4) by means of a CNT membrane (24) installed in front of the X-ray window, and the CNT membrane is replaced as needed.

11. The method according to claim 9, wherein the rotating anode assembly is cooled by a liquid cooling system.

12. The method according to claim 9, further comprising:

termination of the electron bombardment of the liquid-metal target before the rotation is slowed or stopped and cooling the target to a solid state.

13. The method according to claim 9, wherein a start of melting of the target is carried out by electron bombardment and/or inductive heating.

* * * * *